Jan. 7, 1930.  J. LALLY  1,742,211
PIPE JOINT
Filed March 17, 1928
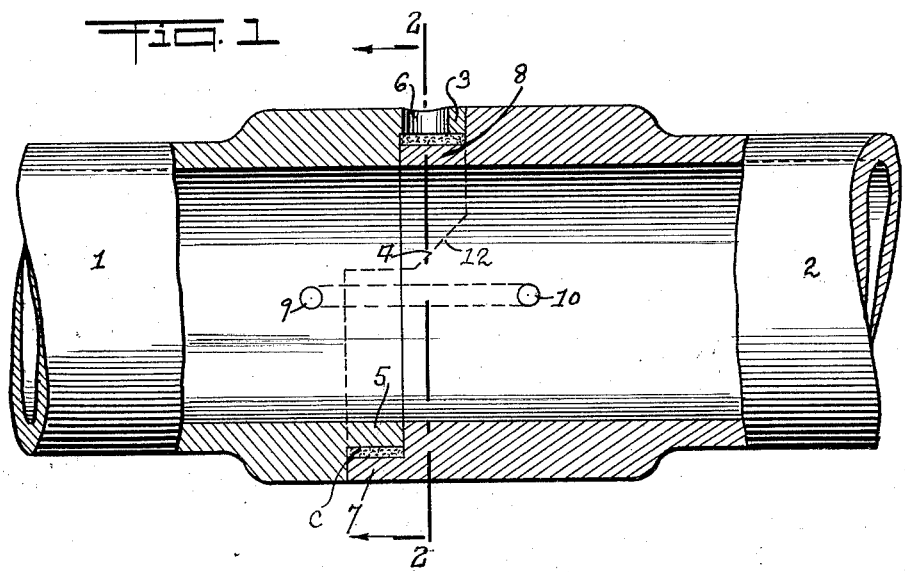
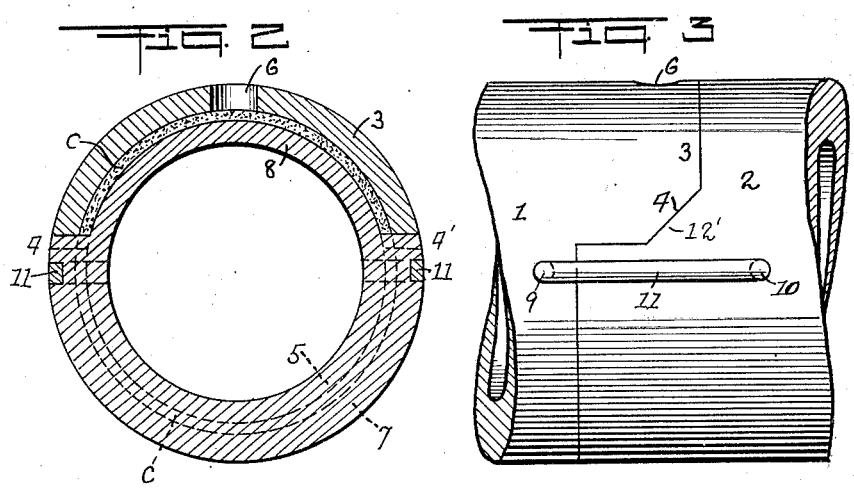
John Lally INVENTOR
BY Robert B Killgore ATTORNEY Patented Jan. 7, 1930

1,742,211

UNITED STATES PATENT OFFICE

JOHN LALLY, OF FLUSHING, NEW YORK; JOHN LALLY, JOSEPH A. HENLEY, AND ELLEN T. LALLY, EXECUTORS OF SAID JOHN LALLY, DECEASED, ASSIGNORS TO LALLY COLUMN CO., OF CAMBRIDGE, MASSACHUSETTS, A CORPORATION OF MASSACHUSETTS

PIPE JOINT

Application filed March 17, 1928. Serial No. 262,370.

My invention relates primarily to lap joints for concrete pipes, especially those of large diameter, and my objects are the production of a joint which will simply and reliably join the sections in a tight manner, to provide a structure to which the mortar or cement can be quickly and easily applied all around the joint and which will hold all the mortar or cement in place without displacing it in joining up the sections; to provide for the use of clamps to hold the sections together; to permit the metal reinforcing to be carried out to the ends of the sections; to permit the sections to be joined by a straight downward movement without endwise sliding; to so form the joint that sealing cement may be applied after the sections are laid in position; and to provide a joint of such construction that a defective section can be quickly removed by a lifting motion and easily replaced.

In the drawing I have shown my improved joint and Fig. 1 is a longitudinal view thereof, partly in section; Fig. 2 is a view of the structure of Fig. 1 on the line 2—2 thereof; and Fig. 3 a side view of the finished joint.

The halves of the joint are formed on the opposed ends of pipe sections 1 and 2 and are preferably made in thickened ends of the sections so that the bore of the pipe will be uniform throughout. The upper half of the outer part of the circumference of the end section 1 extends outwardly to form a flange 3, the corners of which are cut or clipped at an angle 4—4'. This angular cut eliminates sharp corners which are liable to be broken in transit or when lowering one section onto another in joining up. The lower part of the pipe at the inner, or bore face, of the end of the section 1 extends outwardly to form a flange 5, the clipped corners of the flange 3 not quite meeting the upper ends of the flange 5 as shown in Fig. 1. A pouring hole 6 may be formed in the top flange 3.

The end of the other section 2 is a counterpart of the end of the section 1. The lower half of the outer part of the circumference of the pipe end extends outwardly to form a flange 7. The upper half of the inner, or bore face of the end of the section 2 extends outwardly to form a flange 8. The pipe end at the junction of these two flanges is formed to be a counterpart of the clipped corners of the flange 3 as indicated at 12—12'.

The flanges 3 and 8, and 5 and 7, preferably have their opposed faces spaced slightly to hold the mortar or cement used in setting the joint.

Dowel holes 9 and 10 may be formed in opposite sides of the sections and suitable clamps 11 inserted therein to hold the sections together.

In laying pipe embodying my invention section 2 is laid and leveled with the flange 7 at the bottom of the trench and the flange 8 at the top. Mortar or cement is then spread on the inner face of the flange 7 and the outer face of the flange 8. The section 1 is then laid straight down on the prepared joint with the flanges 3 and 8, and 5 and 7, in contact with the mortar or cement. The ends of the flanges 3 and 5 meet the cut corners 4—4', 12—12', and accurately position the sections so that the bores aline.

In some cases instead of spreading mortar the sections may be laid dry and a cement mixture poured through the hole 6 until the stepped, annular space between the flanges 3 and 8, and 5 and 7, is filled.

By this construction the pipe ends have an overlap around their entire circumference and the sealing and bonding material extends entirely around the joint and effectually seals it. The bore of a pipe using my joint is uniform and there are no constrictions at the joints due either to structure or displaced mortar.

If concrete pipe is used in carrying out my invention any desired reinforcement may be used therein and carried out into the flanges, so that great strength is obtained.

In laying the pipe the cut corners 4—4' will slide into position against the recesses 12—12' more easily than if the corners were left square and there is no danger of breaking the corners, such as would exist if they were squared instead of bevelled.

I claim:—

In a pipe joint, the combination of a pipe section provided with an outwardly extending flange at the outer, upper half of the face of the end circumference, the corners of said flange being angularly cut, and an outwardly extending flange at the lower half of the inner face of the end circumference, with a second pipe section provided with an outwardly extending flange at the lower half of the outer, end face of the end circumference and an outwardly extending flange at the upper half of the inner face of the end circumference, the pipe wall being angularly recessed at the junctures of the two flanges to receive the cut corners of the upper flange of the first section, whereby the sections will slide into place, the space between the opposed faces of the pairs of flanges being adapted to contain sealing material.

In testimony whereof I have hereunto subscribed my name.

JOHN LALLY.